United States Patent Office 3,236,737
Patented Feb. 22, 1966

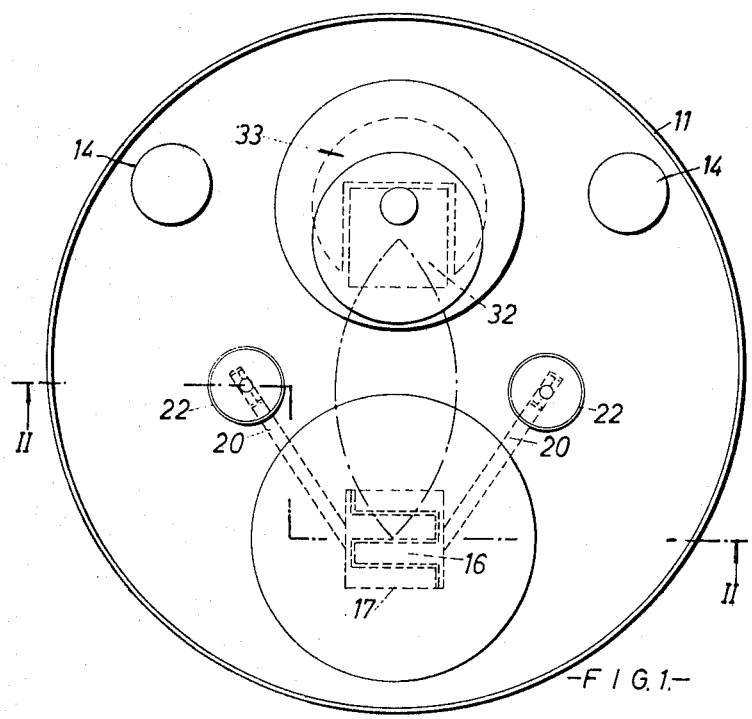
-FIG.1.-

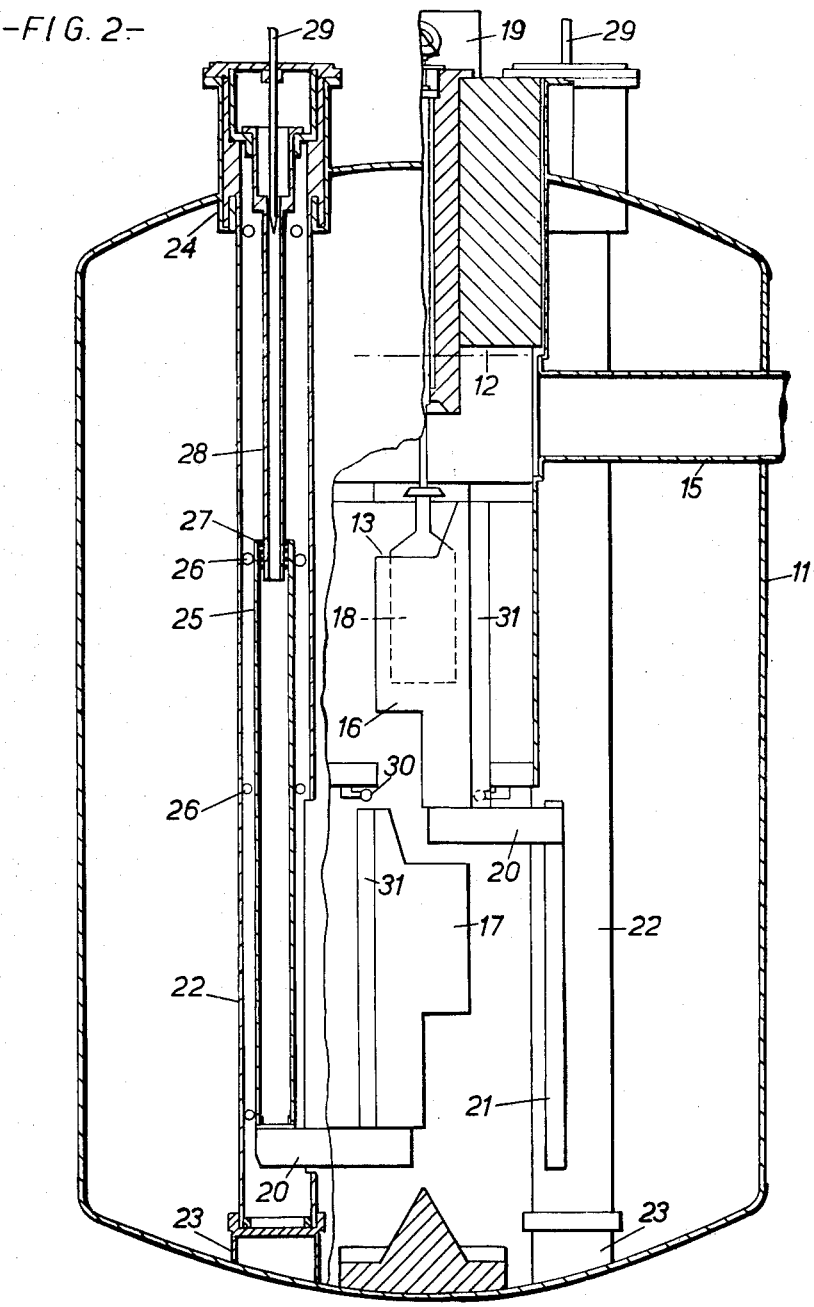

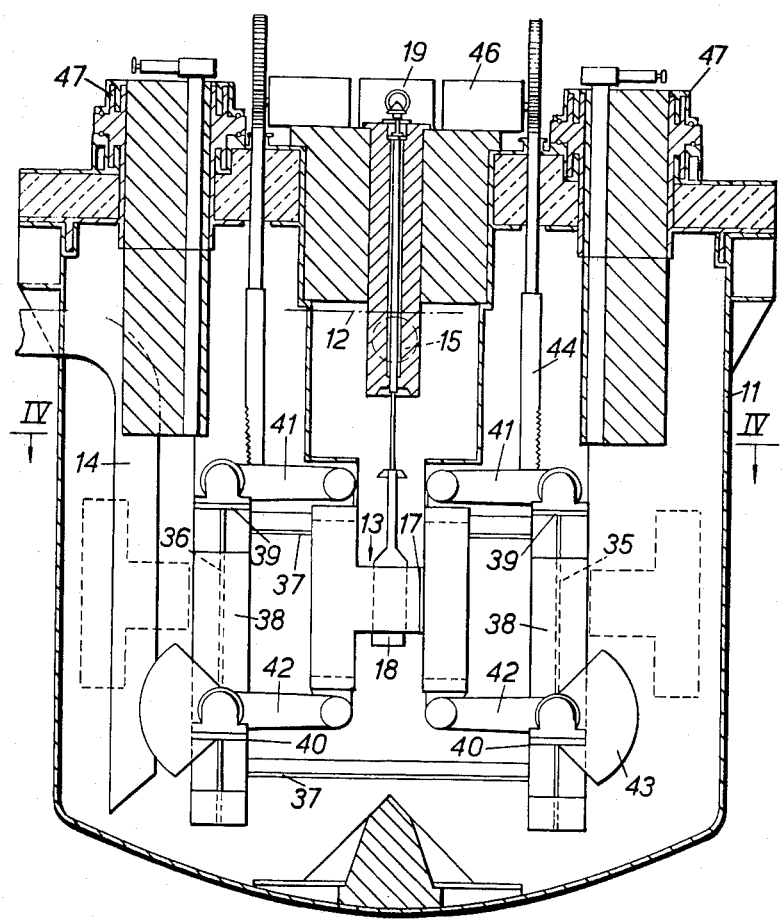

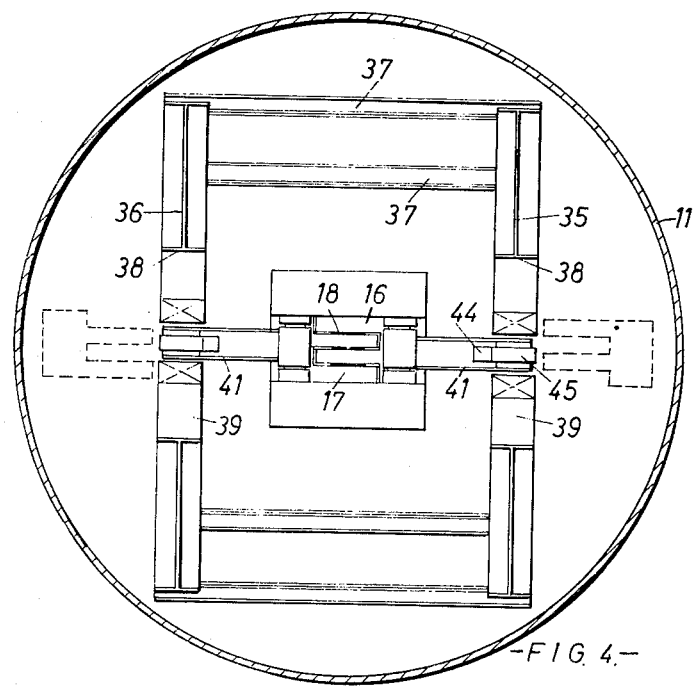
-FIG. 4.-

3,236,737
NUCLEAR REACTOR WITH MOVABLE
CORE PORTIONS
Alexander G. Frame, Thurso, Caithness, Scotland, and
John Webb, Wigan, England, assignors to the United
Kingdom Atomic Energy Authority, London, England
Filed Nov. 27, 1961, Ser. No. 155,125
Claims priority, application Great Britain, Nov. 28, 1960,
40,872/60
6 Claims. (Cl. 176—28)

The present invention relates to nuclear reactors. In the core of a nuclear reactor, where the fissile isotope of nuclear fuel undergoes fission, a condition of criticality ensures in operation that the fission chain reaction is self-sustaining. By increasing or decreasing the reactivity to bring about respectively a supercritical or subcritical condition the neutron flux density, and hence the power, in the core is varied until the desired level is reached. In French Patent No. 1,244,583 there is described a method of changing the reactivity of a core of fuel element assemblies immersed in liquid metal coolant which method includes manipulating discrete fuel element assemblies by moving them horizontally or in directions which include a horizontal component. This method can be used for operational control, that is to say, for carrying out routine corrections of the flux density level and to compensate for inevitable reactivity reduction as a result of the accumulation of fission products in the fuel. Although the utility of the present invention can be regarded as within the broad meaning of reactor control, its primary purpose from this point of view is to facilitate shutting down the reactor in a safe and rapid manner. Circumstances may arise when the reactor is shut down to avert concentration of the core density and therefore a shutting down procedure preferably includes measures to disperse the core composition.

According to the present invention, a core portion sufficient when removed to render the core significantly subcritical for shutting down the reactor is maintained supported independently in the core by support means capable of carrying the core portion bodily between an active position and a dispersed position by a displacement of the support means which at least in part is angular.

More particularly, according to the present invention, a reactor core is divided into a number of portions which when occupying respective active positions fit together to constitute the core, each of the portions being supported independently as a unit by support means capable of carrying the portion bodily between the active position and a dispersed position by displacement which at least in part is angular. Since this entails in a heterogeneous reactor that the core portions can all be dispersed, their refuelling may be carried out elsewhere than at the core region with the advantage that the space in the immediate vicinity of this location is not encumbered with charging and discharging facilities and is left clear to simplify the installation of control equipment for operational control of the core. Thus, a nuclear reactor enabling refuelling in this manner provides a fuel charging and discharging station situated in alignment with the dispersed position of the core portions, or with each such position in the event that the portions are arranged for dispersal to different points. A single dispersed position common to all the core portions is of advantage from the point of view of refuelling in that only a single charging and discharging station is then necessary, whereas, on the other hand, maximum dispersion demands that the core portions are dispersed to different points. These conflicting requirements are reconciled by having the core divided into two half portions with a single dispersed position for both; in this case the reactor is shut down by displacing the one-half portion to the dispersed position and leaving the other one in its active position.

The core portion support means preferably maintains the attitude of the core portions unchanged in the course of being transferred between the two positions. In one form of construction, such means has a linear mode of displacement in one plane for clearing the portion supported thereby from the core and has a swinging mode of displacement in another plane, conveniently perpendicular to the first-mentioned plane, for transferring the portion to and from the dispersed position. Alternatively the displacement is wholly angular in the lengthwise plane of the core portion and the attitude of the latter is maintained unchanged in transit by a construction of the support means which provides parallel pivoted arms to support the core portion in the manner of a parallelogram linkage.

The present invention is primarily applicable to heterogeneous reactors of the kind known as fast reactors in which moderating material is not used in the core; the nuclear fuel in the core is in the form of protectively sheathed rods or tubes referred to as fuel elements. By way of example, two particular embodiments of the invention in a reactor of this kind are illustrated to an extent necessary for understanding the relevant features in the accompanying diagrammatic drawings, in which:

FIG. 1 is a plan view of one embodiment,

FIG. 2 is a section taken on the line II—II of FIG. 1,

FIG. 3 is a section taken vertically through the second embodiment, and

FIG. 4 is a view taken on the line IV—IV of FIG. 3.

In the illustrated embodiments the basic features now to be described are common to both. An upright reactor vessel 11 is filled with a liquid metal primary coolant up to the level indicated 12 so that the reactor core designated generally 13 and occupying a central position inside the vessel is totally submerged. Upwardly directed flow of the coolant through the core to abstract the heat generated thereby is established between an inlet pipe, such as 14 visible to best advantage in FIG. 3, and an outlet pipe, such as 15 (FIG. 2). The core is divided into two interfitting half portions 16 and 17 each shaped to present two spaced parallel slab sections which, when the core is assembled by bringing both the half portions to respective active positions, interleave with the slab sections of the other half portion. The interleaving of the slab sections leaves slight clearance between adjacent sections for the insertion of neutron absorbing control means in the form of plates, such as 18, which are suspended from a lifting and lowering mechanism 19 enabling insertion and withdrawal of the plates into and from the core for the purpose of controlling the reactor in a manner which is now well known.

It is to be understood that the slab sections of the half portions 16 and 17 are in fact frames, or like supporting structure, charged with fuel elements which are conveniently clustered in unitary sub-assemblies according to a lattice or systematically repeated pattern. Breeder regions may also be included by the addition of fertile material in a form similar to the fuel elements.

Referring now more specifically to the embodiment of FIGS. 1 and 2, each of the core portions 16 and 17 stands rigidly mounted on the end of a foot 20 projecting radially through a slit 21 in a rotary column 22. The support means of which the feet and columns are part are identical for both half portions and it will suffice therefore to describe only one, particularly with reference to the view in section appearing to the left of FIG. 2. The column extends vertically from a thrust bearing pedestal 23 at the base of the reactor vessel and passes out through the top of the vessel where a dip seal arrangement 24 is provided. The end of the foot 20 inside the column is attached fixedly to the lower end of a tube 25 guided linearly but non-rotatably by rollers such as 26, the upper end of this tube being connected through a screw and nut device 27 of the recirculating ball type with a rotary tube 28 suspended within the column. A shaft 29 is adapted to be engageable drivingly with the rotary tube 28 so that drive applied to this shaft lifts or lowers the foot 20, and hence the respective core half portion, according to the sense of rotation.

In FIG. 2, the core half portion 17 appears in a position lowered clear from the core region. A roller guide means 30 is so mounted in the vicinity of this region as to enter into a channel 31 backing each of the portions on raising of the portion to the active position, thereby providing positive transverse location in the active position.

For the purpose of shutting down the reactor (assuming the core to be assembled with both the half portions in the active positions), one of the half portions is lowered by drive applied in the appropriate sense to the drive shaft 29 until the foot 20 reaches the lower extremity of the slit 21 in the respective column. At this stage a sub-critical condition prevails and the half portion concerned is clear from the core region and can be swung in a perpendicular plane by rotation of the column 22 through an arc of 90° to a dispersed position in a park area 32, as best seen in FIG. 1 where the arcuate travel is indicated by chain dotted lines. With the one half portion in the dispersed position and the other remaining in the core region, the transverse separation of the two portions is such that, in the event of the fuel collapsing by accidental overheating as a result, for instance, of loss of coolant or inadequate coolant flow, the fuel contents of the two portions cannot reconsolidate to concentrate the core density.

Provision is made for refueling in the park area 32 through an eccentric rotating shield arrangement designated generally 33 (FIG. 1). It will be appreciated that shut down is an inevitable concomitant of refueling and that the half portions are dispersed alternately for servicing in this respect one at a time. Preferably the half portion undergoing a refuelling operation is raised in the park area to approximately the same level as it occupies in the core region when in the active position so as to be brought closer to the rotating shield arrangement for ease of handling of the fuel elements.

Referring now more specifically to the embodiment of FIGS. 3 and 4, a support structure within the reactor vessel comprises parallel flanged side walls 35 and 36 disposed upright to either side of the core region and beams such as 37 extending between the side walls. This structure is supported clear of the base of the reactor vessel from the top, and in a central position in each of the side walls is a vertically extending aperture bounded by flanges 38 and open at its lower end. Projecting into these apertures in the general plane of the side walls are pairs of platforms 39 and 40, the platforms of each pair being spaced apart at their adjacent extremities so that arms 41 and 42 supported pivotally on the respective pairs can swing between the supporting platforms. Each of the core half portions 16 and 17 is pivotally connected at top and bottom respectively with the ends of the arms 41 and 42, these arms being disposed parallel to one another so as to support the respective half portion in the manner of a parallelogram linkage.

The lower arms 42 are counterweighted as at 43 but not to the full extent necessary to obtain equilibrium, the core half portions being positioned against the residual gravitational bias by drive means co-operating with the upper arms 41. As illustrated, an identical drive means in respect of each of the upper arms takes the form of a rack bar 44 held in mesh with a pinion 45 to which the upper arm is fixed, the rack bar being guided through the top of the reactor vessel and having an external drive mechanism 46.

To displace the core half portions 16 and 17 from the active positions (as shown) to the dispersed positions (indicated by broken outlines) the rack bars 44 are driven downwardly thereby swinging the arms 41 and 42 in the vertical lengthwise plane of the core. The core portions descend initially from the active positions and eventually, when the arms have been swung through 180°, reach the dispersed positions without change of attitude in transit.

Aligned vertically with each of the dispersed positions is an eccentric rotating shield arrangement 47 for refuelling purposes. The charging and discharging stations represented by these arrangements are notable for being offset from the core region so that the space above this region is fully available for the control equipment; the same advantage is present in the embodiment of FIGS. 1 and 2.

What we claim is:

1. In a nuclear reactor of the type having a core which normally is stationary and cooled by the flow of a fluid coolant therethrough, the combination comprised by said core of a plurality of fuel-containing core portions co-operating to arrange the fuel therein in a potentially critical core configuration, a pivotally mounted arm supporting at least one of the core portions independently of the remainder and displaceable at least in part angularly between a position in which the core is capable of criticality and a dispersed position in which the respective core portion is spaced laterally of the first mentioned position and in which the core is incapable of criticality, and drive mechanism operatively connected to the arm for driving the arm between the two positions.

2. In a nuclear reactor of the type having a core which is normally stationary and cooled by the flow of a fluid coolant therethrough, the combination comprised by said core of two core portions, a plurality of parallel slab-shaped nuclear fuel sections presented by each portion to interleave for arranging the fuel therein in a potentially critical core configuration, pivotally mounted arms supporting the two portions and displaceable in the planes parallel to the planes of the fuel sections between positions in which the core is capable of criticality and a dispersed position in which one of the respective core portions is spaced laterally of the first mentioned position and in which the core is incapable of criticality, and drive mechanism operatively connected to the arms for driving the arms between the two positions.

3. In a nuclear reactor of the type having a core which is normally stationary and cooled by the flow of a fluid coolant therethrough, the combination comprised by said core of two core portions, a plurality of parallel slab-shaped nuclear fuel sections presented by each portion to interleave for arranging the fuel therein in a potentially critical core configuration, pivotally mounted arms supporting the two core portions respectively, two extensible control shafts supporting the two arms respectively, the control shafts lying in planes parallel to the planes of the sections, and drive mechanism operatively connected to each shaft for firstly extending each control shaft to cause relative disengagement of the core portions and secondly for causing an angular movement of the arms by which the core portions are displaceable to dispersed refueling positions in which the portions are spaced laterally from the critical position.

4. In a nuclear reactor of the type having a core which is normally stationary and cooled by the flow of a fluid coolant therethrough, the combination comprised by said core of two core portions, a plurality of parallel slab-shaped nuclear fuel sections presented by each portion to interleave for arranging the fuel therein in a potentially critical core configuration, pivotally mounted arms supporting each core portion and mounted for pivotal movement in a plane parallel to the planes of the sections, and drive mechanism operatively connected to the parallel arms for swinging the arms in the manner of a parallel linkage to disengage the core portions and to carry them bodily to dispersed refuelling positions in which the portions are spaced laterally from the critical position.

5. Apparatus as set forth in claim 4 wherein each of said core portions is supported by a pair of said pivotally mounted arms, the arms of each pair being parallel to each other and rotatably connected at their movable ends to a respective core portion so as to form three sides of a parallelogram-type linkage, whereby pivotal movement of each pair of arms results in movement of their respective core portion to a dispersed refuelling position without change of attitude of the core portion in transit.

6. Apparatus as set forth in claim 3 wherein said control shafts are substantially parallel to each other and spaced apart at a distance such that the arcuate paths followed by the respective core portions during angular movement of the respective pivotally mounted arms intersect at two laterally spaced points, one of said points being located at said critical position and the other of said points being located in the immediate vicinity of said refuelling positions.

References Cited by the Examiner
UNITED STATES PATENTS

| | | | |
|---|---|---|---|
| 2,812,304 | 11/1957 | Wheeler | 176—28 |
| 2,993,850 | 7/1961 | Soodak et al. | 176—21 |
| 3,047,486 | 7/1962 | Hanson | 176—28 |
| 3,079,320 | 2/1963 | Weill | 176—28 |

CARL D. QUARFORTH, *Primary Examiner.*

REUBEN EPSTEIN, *Examiner.*